US011366199B2

(12) United States Patent
Lang et al.

(10) Patent No.: US 11,366,199 B2
(45) Date of Patent: Jun. 21, 2022

(54) PHASE CALIBRATION IN FMCW RADAR SYSTEMS

(71) Applicant: Infineon Technologies AG, Neubiberg (DE)

(72) Inventors: Oliver Lang, Linz (AT); Michael Gerstmair, Langenstein (AT); Alexander Melzer, Neutillmitsch (AT); Alexander Onic, Linz (AT); Christian Schmid, Linz (AT)

(73) Assignee: Infineon Technologies AG, Neubiberg (DE)

( * ) Notice: Subject to any disclaimer, the term of this patent is extended or adjusted under 35 U.S.C. 154(b) by 392 days.

(21) Appl. No.: 16/697,782

(22) Filed: Nov. 27, 2019

(65) Prior Publication Data

US 2020/0174098 A1      Jun. 4, 2020

(30) Foreign Application Priority Data

Nov. 30, 2018  (DE) .......................... 102018130556.7

(51) Int. Cl.
| | |
|---|---|
| *G01S 7/40* | (2006.01) |
| *G01S 13/00* | (2006.01) |
| *G01S 13/931* | (2020.01) |

(52) U.S. Cl.
CPC .......... *G01S 7/4056* (2013.01); *G01S 7/4008* (2013.01); *G01S 7/4078* (2021.05); *G01S 13/003* (2013.01); *G01S 13/931* (2013.01)

(58) Field of Classification Search
CPC .... G01S 13/003; G01S 13/931; G01S 7/4056; G01S 7/4008; G01S 7/4078
See application file for complete search history.

(56) References Cited

U.S. PATENT DOCUMENTS

| | | | |
|---|---|---|---|
| 2015/0009064 A1* | 1/2015 | Waldschmidt | ........... H04B 1/30 342/175 |
| 2017/0199270 A1* | 7/2017 | Huemer | .................. G01S 7/352 |

(Continued)

FOREIGN PATENT DOCUMENTS

| | | |
|---|---|---|
| DE | 102010002759 A1 | 9/2011 |
| DE | 202017103676 U1 | 10/2018 |

OTHER PUBLICATIONS

Li et al., "Efficient Mixed-Spectrum Estimation with Applications to Target Feature Extraction", IEE Transactions on Signal Processing vol. 44, No. 2, Feb. 1996, 15 pages.

*Primary Examiner* — Thomas M Hammond, III
(74) *Attorney, Agent, or Firm* — Harrity & Harrity, LLP (57) ABSTRACT

A method for a radar system is described. In accordance with one example implementation, the method comprises generating a frequency-modulated RF oscillator signal and feeding the RF oscillator signal to a first transmitting channel and a second transmitting channel. The method further comprises generating a first RF transmission signal in the first transmitting channel based on the RF oscillator signal, emitting the first RF transmission signal via a first transmitting antenna, receiving a first RF radar signal via a receiving antenna, and converting the first RF radar signal to a baseband, as a result of which a first baseband signal is obtained, which has a first signal component having a first frequency and a first phase, where the first signal component is assignable to direct crosstalk from the first transmitting antenna. This procedure is repeated for the second transmitting channel.

20 Claims, 7 Drawing Sheets

(56) References Cited

U.S. PATENT DOCUMENTS

2019/0146059 A1\* 5/2019 Zanati ...................... H01Q 3/38
                                                                                                342/173
2019/0187245 A1\* 6/2019 Guarin Aristizabal ......................
                                                                                               G01S 13/931

\* cited by examiner

PHASE CALIBRATION IN FMCW RADAR SYSTEMS

CROSS REFERENCE TO RELATED APPLICATION

This application claims priority under 35 U.S.C. § 119 to German Patent Application No. 102018130556.7 filed on Nov. 30, 2018, the contents of which are incorporated by reference herein in their entirety.

TECHNICAL FIELD

The present description relates to the field of radar sensors, in particular to a phase calibration used in multiple-input multiple-output (MIMO) radar systems for calibrating and monitoring the phase of the radar signals emitted via different channels.

BACKGROUND

Radar sensors are used in a multiplicity of applications for detecting objects (so-called radar targets), wherein the detecting usually comprises measuring distances and speeds of the detected objects. In the automotive field, in particular, there is an increasing need for radar sensors which can be used, inter alia, in driving assistance systems (Advanced driver assistance systems, ADAS) such as e.g. in cruise control (ACC, Adaptive Cruise Control, or Radar Cruise Control) systems. Such systems can automatically adapt the speed of an automobile in order to maintain a safe distance from other automobiles ahead (and also other objects and pedestrians). Further applications in the automotive field are e.g. blind spot detection, lane change assist and the like. In the field of autonomous driving, radar sensors will play an important part for the control of autonomous vehicles.

Precise detection of objects in the measurement range of a radar sensor generally requires a radar system comprising a plurality of transmitting and receiving channels. Such radar systems are usually referred to a MIMO (multiple input multiple output) radar systems. MIMO systems are required particularly if the intention is to determine not only the distance and the speed of an object but also the azimuth angle thereof. Signal processing techniques generally referred to as beamforming techniques can be used for ascertaining the azimuth angle assigned to a radar target.

The use of beamforming techniques allows the formation of virtual antenna arrays comprising virtual receiving antennas and virtual receiving channels assigned thereto. By way of example, in a radar system comprising eight (real) transmitting channels (TX channels) and four (real) receiving channels, it is possible to form a virtual antenna array comprising 32 (eight times four) virtual receiving antennas. For this purpose, however, it is useful for the relative phases of the transmission signals emitted via the TX channels to be known. On account of unavoidable tolerances and cross-sensitivities (e.g. with regard to the temperature), it may be beneficial to measure and/or to calibrate the phases of the transmission signals emitted via the TX channels.

SUMMARY

A method for a radar system is described. In accordance with one example implementation, the method comprises generating a frequency-modulated radio frequency (RF) oscillator signal and feeding the RF oscillator signal to a first transmitting channel and a second transmitting channel. The method further comprises generating a first RF transmission signal in the first transmitting channel based on the RF oscillator signal, emitting the first RF transmission signal via a first transmitting antenna, receiving a first RF radar signal via a receiving antenna, and converting the first RF radar signal to a baseband, as a result of which a first baseband signal is obtained, which has a first signal component having a first frequency and a first phase, the first signal component being assignable to direct crosstalk from the first transmitting antenna. The method further comprises generating a second RF transmission signal in the second transmitting channel based on the RF oscillator signal, emitting the second RF transmission signal via a second transmitting antenna, receiving a second RF radar signal via the receiving antenna and converting the second RF radar signal to the baseband, as a result of which a second baseband signal is obtained, which has a second signal component having a second frequency and a second phase, the second signal component being assignable to direct crosstalk from the second transmitting antenna. The method further comprises determining the first phase based on the first baseband signal and determining the second phase based on the second baseband signal. This is followed by determining a value representing the difference between a phase shift caused by the first transmitting channel and a phase shift caused by the second transmitting channel, based on the first phase and the second phase and further based on parameters, representing a phase shift on account of the direct crosstalk from the first transmitting antenna and the direct crosstalk from the second transmitting antenna.

In accordance with a further example implementation, a method comprises generating a frequency-modulated RF oscillator signal and an RF reference signal, generating a first RF transmission signal in a first transmitting channel based on the RF oscillator signal, emitting the first RF transmission signal via a first transmitting antenna, receiving a first RF radar signal via a receiving antenna, and converting the first RF radar signal to a baseband by mixing with the RF reference signal using a first mixer, as a result of which a first baseband signal is obtained, which has a first signal component having a first frequency and a first phase, the first signal component being assignable to direct crosstalk from the first transmitting antenna. The method further comprises determining the first phase based on the first baseband signal. The RF reference signal is frequency-shifted in relation to the RF oscillator signal; alternatively or additionally, the first baseband signal is frequency-shifted before the phase is determined.

Further example implementations relate to a radar device comprising a local oscillator, at least one transmitting channel and at least one receiving channel, and a computing unit. The radar device is configured to implement the methods described herein.

BRIEF DESCRIPTION OF THE DRAWINGS

Example implementations are explained in greater detail below with reference to figures. The illustrations are not necessarily to scale and the example implementations are not restricted only to the aspects illustrated. Rather, the figures illustrate the principles underlying the example implementations.

DETAILED DESCRIPTION

Figure 1:
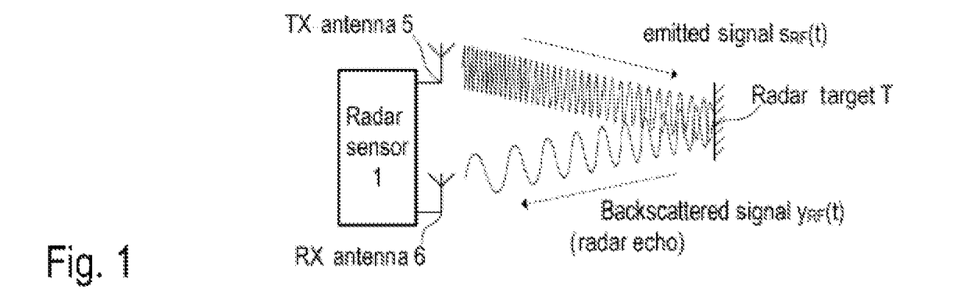
FIG. 1 is a schematic diagram for illustrating the functional principle of an FMCW radar system for distance and/or speed measurement.

FIG. 1 illustrates, in a schematic diagram, the application of a frequency-modulated continuous-wave radar system—usually referred to as FMCW radar system—as sensor for the detection of objects, which are usually referred to as radar targets. The detection usually comprises ascertaining distance (also referred to as Range) and speed of the respective radar target. In order to localize the target even more accurately, modern radar systems are configured also to ascertain the azimuth angle of a target.

In the present example, the radar device 1 comprises separate transmitting (TX) and receiving (RX) antennas 5 and 6 respectively (bistatic or pseudo-monostatic radar configuration). It should be noted, however, that a single antenna can also be used, which serves simultaneously as transmitting antenna and as receiving antenna (monostatic radar configuration). The transmitting antenna 5 emits a continuous RF signal $s_{RF}(t)$, which is frequency-modulated for example with a type of sawtooth signal (periodic, linear frequency ramp). The emitted RF radar signal $s_{RF}(t)$ is backscattered at the radar target T and the backscattered/reflected signal $y_{RF}(t)$ (echo signal) is received by the receiving antenna 6. FIG. 1 shows a simplified example; in practice, radar sensors are systems comprising a plurality of transmitting (TX) and receiving (RX) channels in order also to be able to ascertain the angle of incidence (Direction of Arrival, DoA) of the backscattered/reflected signal $y_{RF}(t)$, e.g. the abovementioned azimuth angle of the radar target T.

Figure 2:
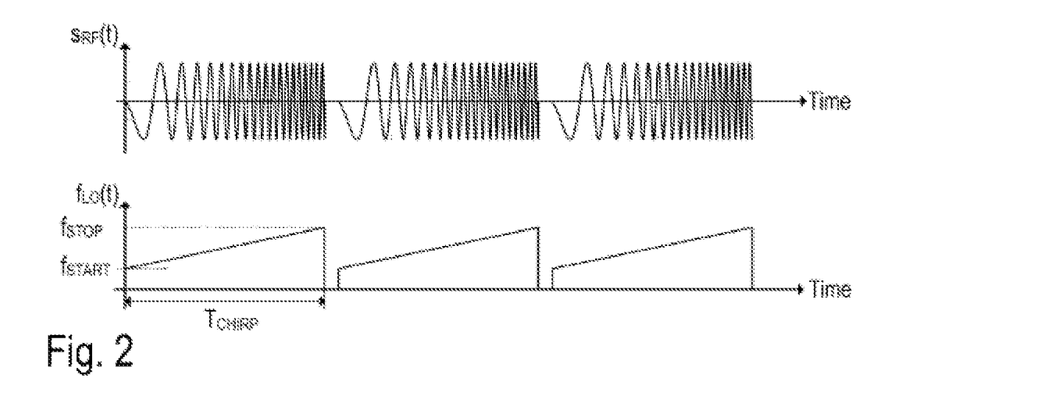
FIG. 2 comprises two timing diagrams for illustrating the frequency modulation (FM) of an RF signal generated by the FMCW system.

FIG. 2 illustrates by way of example the abovementioned frequency modulation of the signal $s_{RF}(t)$. As illustrated in FIG. 2 (upper diagram), the emitted RF signal $s_{RF}(t)$ is composed of a set of "Chirps", that is to say that the signal $s_{RF}(t)$ comprises a sequence of sinusoidal signal profiles (waveforms) having a rising frequency (Up-Chirp) or a falling frequency (Down-Chirp). In the present example, the instantaneous frequency $f_{LO}(t)$ of a chirp beginning at a start frequency $f_{START}$ rises linearly within a time period $T_{CHIRP}$ to a stop frequency $f_{STOP}$ (see lower diagram in FIG. 2). Such chirps are also referred to as linear frequency ramps. FIG. 2 illustrates three identical linear frequency ramps. It should be noted, however, that the parameters $f_{START}$, $f_{STOP}$, $T_{CHIRP}$ and also the pause between the individual frequency ramps (and thus the chirp repetition rate) can vary. The frequency variation also need not necessarily be linear (linear chirp). Depending on the implementation, transmission signals with exponential or hyperbolic frequency variation (exponential or hyperbolic chirps, respectively) can also be used, for example.

A radar echo signal $y_{RF}(t)$ received via an RX antenna is a temporally shifted (delay time τ) and scaled version of the radar signal $s_{RF}(t)$ emitted via the associated TX antenna (cf. FIG. 1). In the case of linear chirps (frequency ramps), this delay time τ corresponds to a constant frequency offset Δf between the emitted radar signal $s_{RF}(t)$ and the received radar echo signal $y_{RF}(t)$. The ratio k=Δf/τ corresponds to the gradient of the frequency ramp (hertz per second), which is in turn given by k=B/$T_{CHIRP}$ (bandwidth B=|$f_{START}$−$f_{STOP}$|). The frequency offset Δf can be measured using known techniques and the following thus holds true for the delay time τ (e.g. the round-trip delay time of the radar signal from the TX antenna to the RX antenna):

$$\tau = \Delta f \cdot T_{CHIRP}/B = \Delta f/k. \quad (1)$$

The roundtrip delay time τ corresponds to a distance x=c·τ (c denotes the speed of light) covered by the radar signal. The frequency offset Δf measured by the radar device (by down-converting the radar echo signal and spectral analysis) contains information about the round-trip delay time of the radar signal and thus also about the path distance x covered by the radar signal.

Figure 3:
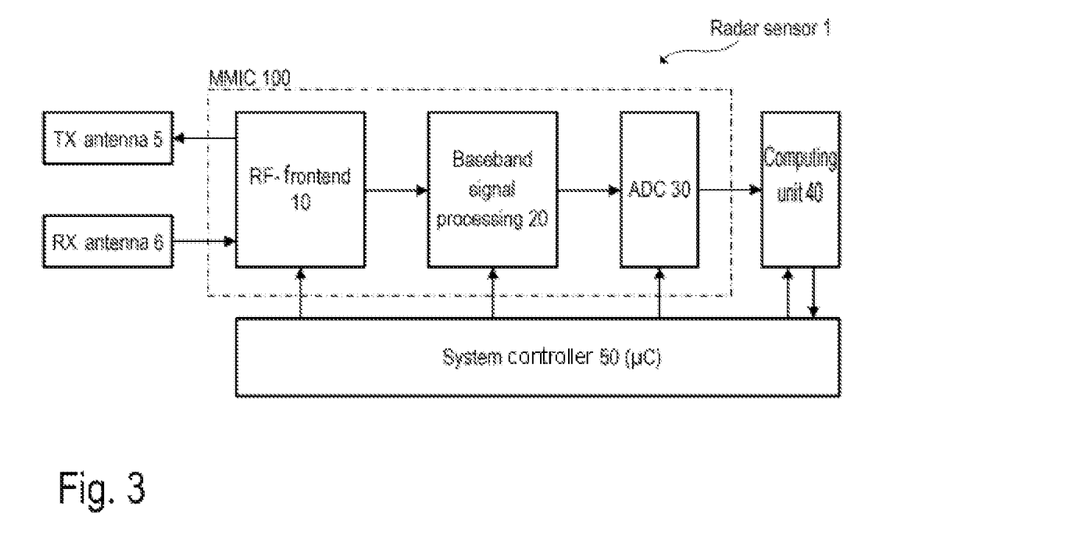
FIG. 3 is a block diagram for illustrating the fundamental structure of an FMCW radar system.

FIG. 3 is a block diagram which illustrates one possible structure of a radar device 1 (radar sensor) by way of example. Accordingly, one or more transmitting antennas 5 (TX antennas) and one or more receiving antennas 6 (RX antennas) are connected to an RF frontend 10 which is integrated in a chip and which can include all those circuit components which are used for the RF signal processing. Said circuit components comprise for example a local oscillator (LO), RF power amplifiers, low-noise amplifiers (LNAs), directional couplers (e.g. rat race couplers, circulators, etc.) and mixers for the down-conversion of the RF signals to the baseband or an intermediate frequency band (IF band). The RF frontend 10—if appropriate together with further circuit components—can be integrated in one chip or in a plurality of chips, usually referred to as monolithic microwave integrated circuits (MMICs).

The example illustrated shows a bistatic (or pseudo-monostatic) radar system comprising separate RX and TX antennas. In the case of a monostatic radar system, the same antenna would be used both for emitting and for receiving the electromagnetic (radar) signals. In this case, by way of example, a directional coupler (e.g. a circulator) can be used to separate the RF signals to be emitted from the received RF signals (radar echo signals). As mentioned, radar systems in practice usually comprise a plurality of transmitting and receiving channels having a plurality of transmitting and receiving antennas, respectively, which makes it possible, inter alia, to measure the direction (Direction of Arrival, DoA) from which the radar echoes are received. In Multiple-Input Multiple-Output (MIMO) systems of this type, the individual (physical) TX channels and RX channels are usually constructed identically or similarly in each case. From a plurality of TX antennas and RX antennas, it is possible to form so-called virtual antenna arrays, which can be used for implementing beamforming techniques. By way of example, a system comprising three TX antennas and four RX channels can be used to implement an antenna array comprising 12 (three times four) virtual antenna elements. The phase differences between the emitted antenna signals (or the RF output signals of the TX channels) are of importance for the application of beamforming techniques.

In the case of an FMCW radar system, the RF signals emitted via the TX antenna(s) 5 can lie e.g. in the range of approximately 20 GHz to 100 GHz (e.g. around 77 GHz in some applications). However, this range is merely one example and other frequencies are also possible. As mentioned, the RF signal received by each RX antenna 6 comprises radar echoes (chirp echo signals), e.g. those signal components which are backscattered at one or at a plurality of radar targets. In each RX channel, the received RF signal $y_{RF}(t)$ is down-converted to the baseband and can be processed further in the baseband using analog signal processing (see FIG. 3, analog baseband signal processing chain 20). The analog signal processing mentioned can substantially comprise filtering and, if appropriate, amplification of the baseband signal. The baseband signal is finally digitized (see FIG. 3, analog-to-digital convertor 30) and processed further in the digital domain. The digital signal processing chain can be realized at least partly as software (e.g. firmware) which can be executed on one or on a plurality of processors, for example a microcontroller and/or a digital signal processor (see FIG. 3, computing unit 40).

Figure 9:
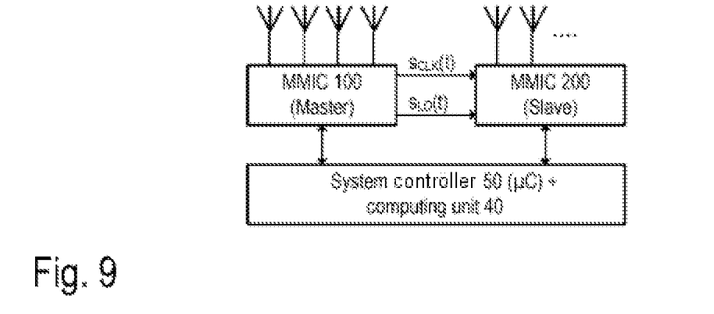
FIG. 9 illustrates a MIMO system distributed among a plurality of radar chips.
Figure 10:
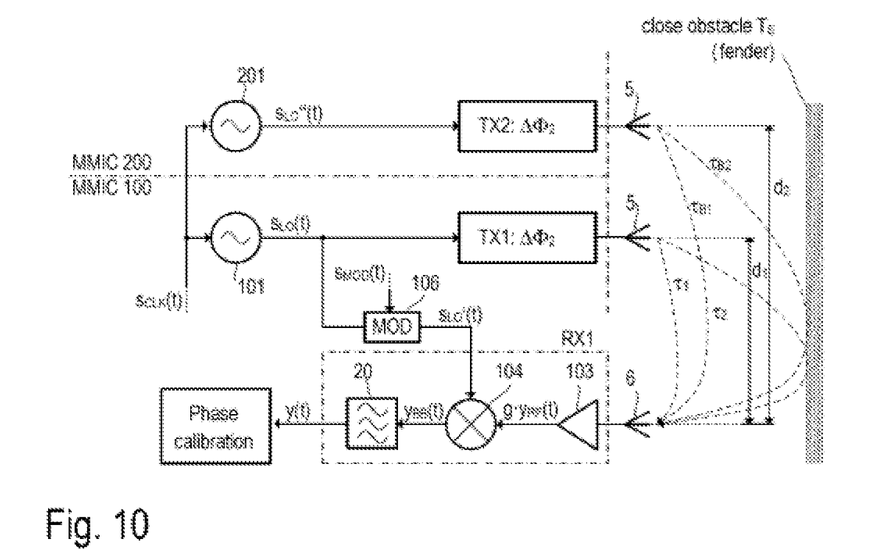
FIGS. 10 and 11 are two block diagrams for illustrating further example implementations comprising distributed MIMO systems.
Figure 11:
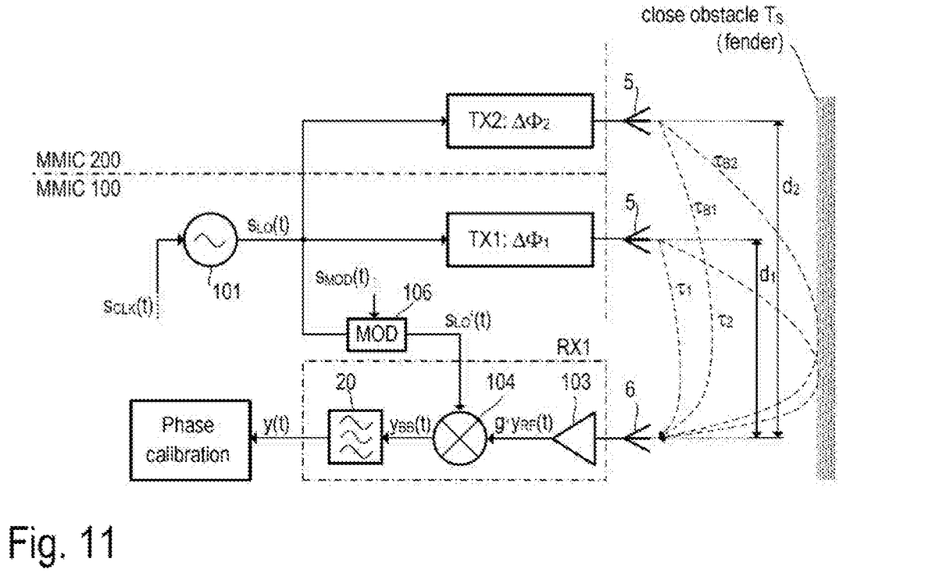

The overall system is generally controlled via a system controller 50, which can likewise be implemented at least partly via software/firmware which is executed on a processor such as e.g. a microcontroller. The RF frontend 10 and the analog baseband signal processing chain 20 (optionally also the analog-to-digital convertor 30 and the computing unit 40) can be jointly integrated in a single MMIC (e.g. an RF semiconductor chip). Alternatively, the individual components can also be distributed among a plurality of integrated circuits (MMICs). In order to simplify the illustration, and since it is not necessary for the further explanations, hereinafter no distinction is drawn between "Single-Chip" radar systems and distributed radar systems and it goes without saying that the example implementations described here can be implemented both as single-chip systems and as distributed radar systems. The examples in FIGS. 9 to 11 show by way of example implementations comprising two MMICs (Master MMIC and Slave MMIC). In other examples, more than two MMICs can also be cascaded.

Figure 4:
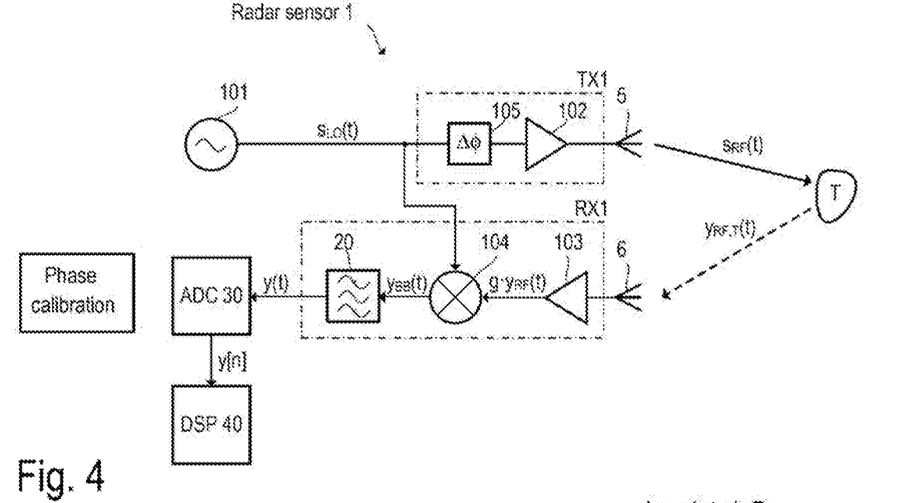
FIG. 4 is a circuit diagram for illustrating a simplified example of a radar transceiver having one transmitting channel and one receiving channel.

FIG. 4 illustrates one example implementation of a radar transceiver 1 in accordance with the example from FIG. 3 in greater detail. The present example illustrates in particular the RF frontend 10 of the radar sensor 1 (cf. FIG. 3). It should be noted that FIG. 4 illustrates a simplified circuit diagram in order to show the fundamental structure of the RF frontend 10 with one transmitting channel (TX channel) and one receiving channel (RX channel). Actual implementations, which may depend greatly on the specific application, are usually more complex and comprise a plurality of TX and/or RX channels. Such systems comprising a plurality of TX and RX channels can be operated as MIMO systems.

The RF frontend 10 comprises a local oscillator 101 (LO), which generates an RF oscillator signal $s_{LO}(t)$. The RF oscillator signal $s_{LO}(t)$ is frequency-modulated during operation, as described above with reference to FIG. 2, and is also referred to as LO signal. In radar applications, the LO signal usually lies in the SHF (Super High Frequency, centimeter-wave) or in the EHF (Extremely High Frequency, millimeter-wave) band, e.g. in the interval of 76 GHz to 81 GHz in some automotive applications. As mentioned, however, example implementations described here and the application thereof are not restricted to these frequencies. The LO signal $s_{LO}(t)$ is processed both in the transmission signal path TX1 (in the TX channel) and in the reception signal path RX1 (in the RX channel).

The RF transmission signal $s_{RF}(t)$ (cf. FIG. 2), emitted by the TX antenna 5, is generated by amplifying the LO signal $s_{LO}(t)$, for example using the RF power amplifier 102, and is thus merely an amplified and possibly phase-shifted version of the LO signal $s_{LO}(t)$. The output of the amplifier 102 can be coupled to the TX antenna 5 (in the case of a bistatic or pseudo-monostatic radar configuration). The RF reception signal $y_{RF}(t)$ received by the RX antenna 6 is fed to the receiver circuit in the RX channel and thus directly or indirectly to the RF port of the mixer 104. In the present example, the RF reception signal $y_{RF}(t)$ (antenna signal) is preamplified using the amplifier 103 (gain g). The mixer 104 thus receives the amplified RF reception signal $g \cdot y_{RF}(t)$. The amplifier 103 can be e.g. an LNA. The LO signal $s_{LO}(t)$ is fed to the reference port of the mixer 104, such that the mixer 104 down-converts the (preamplified) RF reception signal $y_{RF}(t)$ to the baseband.

The down-converted baseband signal (mixer output signal) is designated below by $y_{BB}(t)$. Said baseband signal $y_{BB}(t)$ is firstly processed further in analog fashion, wherein the analog baseband signal processing chain 20 substantially brings about further amplification and (e.g. bandpass or low-pass) filtering in order to suppress undesired sidebands and image frequencies. The resulting analog output signal of the receiving channel RX1, which is fed to an analog-to-digital convertor (see FIG. 3, ADC 30), is designated by y(t). Methods for the digital further processing of the digitized baseband output signal (digital radar signal y[n]) are known per se (for example Range Doppler analysis) and therefore will not be discussed in further detail here.

In the present example, the mixer 104 down-converts the preamplified RF reception signal $g \cdot y_{RF}(t)$ (e.g. the amplified antenna signal) to the baseband. The mixing can take place in one stage (that is to say from the RF band directly to the baseband) or via one or more intermediate stages (that is to say from the RF band to an intermediate frequency band and further to the baseband). In this case, the reception mixer 104 effectively comprises a plurality of individual mixer stages connected in series. The mixer 104 can be implemented in various ways. In some example implementations, an IQ demodulator (in-phase/quadrature-phase demodulator) can be used as the mixer 104, which has the consequence that the (digital) baseband signal y[n] is a complex-valued signal. Normal mixers that yield a real baseband signal y[n] are used in other example implementations. The concepts described here are applicable to both variants.

In the case of radar systems comprising a plurality of TX channels and a plurality of RX channels (so-called Multi-Input/Multi-Output (MIMO) systems), it is beneficial for the phases of radar signals emitted via different TX channels to correspond to a specified value. As mentioned in the introduction, a virtual antenna array comprising a plurality of virtual receiving antennas/channels can be formed in a MIMO radar system. For this purpose, it may be beneficial that, in particular, the relative phases (e.g. the respective phase differences) of the radar signals emitted via different TX channels have defined values. However, the phase shift $\Delta\Phi$ caused by a TX channel is dependent on unavoidable tolerances during production and additionally has cross-sensitivities, e.g. in relation to temperature. Furthermore, aging effects can alter the phase over the course of time. For this reason, modern radar systems comprise circuit components that allow a setting of the phases of the radar signals emitted via the different TX channels. For this purpose, the TX channels can have phase shifters (cf. FIG. 4, phase shifter 105). Said phase shifters can bring about a settable (additional) phase shift $\Delta\phi$ which contributes to the total phase shift $\Delta\Phi$ caused in the respective TX channel.

Figure 5:
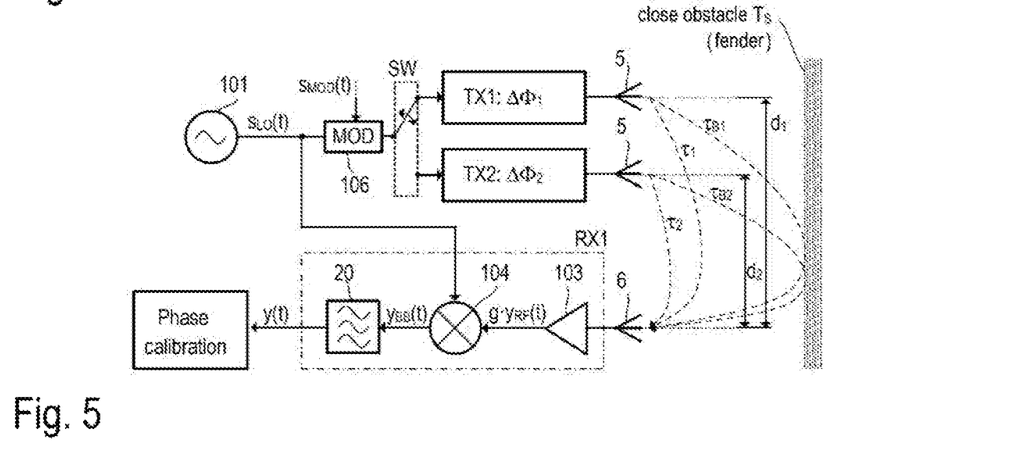
FIG. 5 is a simplified block diagram for illustrating a first example implementation.

The example implementations described here utilize the unavoidable crosstalk between TX channels and RX channels to carry out a phase calibration. FIG. 5 illustrates one example of a radar system comprising two TX channels TX1 and TX2 and one RX channel RX1. It goes without saying that FIG. 5 merely shows a simplified example, and MIMO radar systems used in practice can comprise significantly more TX and RX channels. The TX channels TX1, TX2 and the RX channel RX1 can be constructed in a manner substantially identical to that in the example from FIG. 4. Unlike in FIG. 4, however, a modulator MOD 106 is arranged between the local oscillator 101 and the TX channels and modulates the LO signal $s_{LO}(t)$ with a modulation signal $s_{MOD}(t)$. The modulation signal $s_{MOD}(t)$ can be a sinusoidal signal having a frequency $f_{MOD}$ that is e.g. between 0.1 and 2 MHz. As a result, the modulator 106 brings about a frequency shift of the LO signal by the modulation frequency $f_{MOD}$.

Assuming that $s_{LO}(t)=\cos(2\pi f_{LO}t)$ holds true for the LO signal fed to the modulator, then $s_{LO}'(t)=\cos(2\pi(f_{LO}-f_{MOD})t)$ holds true for the output signal $s_{LO}'(t)$ of the modulator. The amplitude of the LO signal is assumed to be one, without restricting the generality. In a simplified consideration, possible phase shifts can be ascribed to the phase shifts $\Delta\Phi_1$, $\Delta\Phi_2$ of the TX channels TX1 and TX2, respectively. For the radar signals emitted by the TX antennas 5 it thus holds true that $$s_{RF,k}(t)=A_k\cos(2\pi(f_{LO}-f_{MOD})t+\Delta\Phi_k), \quad (2)$$

wherein the index k denotes the channel, e.g. k={1, 2} in the present example with two channels. The output of the modulator 106 is connected to the TX channels TX1, TX2 via the RF switch SW. During a frequency ramp, the frequency $f_{LO}$ is not constant, but rather rises (in the case of an up-chirp) linearly, e.g.

$$f_{LO}=f_{START}+k\cdot t \quad (3)$$

and from this it follows (cf. Equation 2) for the output signal of the k-th channel TXk that:

$$s_{RF,k}(t)=A_k\cos(2\pi(f_{START}-f_{MOD})t+k\pi t^2+\Delta\Phi k). \quad (4)$$

The time derivative of the argument of the cosine function from equation 4 divided by $2\pi$ yields the instantaneous frequency in accordance with equation 3. The modulated (frequency-shifted) LO signal $s_{LO}'(t)$ is fed to one of the TX channels depending on the switch position. The ADC 30 has been omitted in FIG. 5 for the sake of simplicity. The calculations used for the phase calibration can be carried out by a computing unit, for example by a digital signal processor 40 (see FIG. 4).

As mentioned, crosstalk is always present in FMCW radar systems. Direct crosstalk denotes the effect that a transmission signal emitted via a transmitting antenna is received again by a receiving antenna directly—e.g. without reflection at an object. FIG. 5 schematically illustrates direct crosstalk, wherein the round-trip delay time from the transmitting channel TX1 to the receiving channel RX1 is designated by $\tau_1$ and the round-trip delay time from the transmitting channel TX2 to the receiving channel RX1 is designated by $\tau_2$. As mentioned, these round-trip delay times can be assigned the path distances $d_1=c\cdot\tau_1$ and $d_2=c\cdot\tau_2$, respectively, which substantially correspond to the distances between the transmitting antennas 5 and the receiving antenna 6.

In addition to direct crosstalk, in practice indirect crosstalk often occurs, in the case of which the emitted radar signal is reflected at an obstacle situated very near the antenna. Such obstacles are sometimes also referred to as Short-Range Targets, and the (indirect) crosstalk associated therewith is often also referred to as "Short-Range Leakage". In applications in the automotive field, such a Short-Range Target can be formed for example by the fender of an automobile. In FIG. 5, such a Short-Range Target is designated by $T_S$, and the associated round-trip delay times from the TX channels TX1 and TX2 to the RX channel RX1 are designated by $\tau_{B1}$ and $\tau_{B2}$, respectively. In automotive applications in which radar sensors are arranged behind the fender of a vehicle, the fender practically always causes indirect crosstalk.

Both direct crosstalk and indirect crosstalk have an effect in the resulting baseband signal $y_{BB}(t)$ that is similar to the effect of a radar target situated very near the antennas. The round-trip delay times $\tau_1$ and $\tau_2$ and also $\tau_{B1}$ and $\tau_{B2}$ are so short that the resulting frequency offsets in accordance with equation 1 are very small (e.g. close to zero hertz, designated as $\Delta f$ in equation 1). In many applications, radar frontends are usually implemented in such a way that such small frequencies are eliminated by the analog baseband signal processing chain 20 (e.g. high-pass filter or bandpass filter). Accordingly, the output signal $y(t)$ and the digital baseband signal $y[n]$ no longer contain these small frequencies. As a result of the frequency shift by the modulation frequency $f_{MOD}$ that is brought about by the modulator 106, the frequency offsets mentioned are increased by the value $f_{MOD}$. In the example illustrated in FIG. 5, the following (shifted) frequency offsets result for direct and indirect crosstalk:

$$f_1=\tau_1 k+f_{MOD}\approx f_{MOD}, \quad (5)$$

$$f_{B1}=\tau_{B1} k+f_{MOD}, \quad (6)$$

$$f_2=\tau_2 k+f_{MOD}\approx f_{MOD} \text{ and} \quad (7)$$

$$f_{B2}=\tau_{B2} k+f_{MOD}, \quad (8)$$

for the crosstalk from the transmitting channel TX1 to the receiving channel RX1 and respectively the crosstalk from the transmitting channel TX2 to the receiving channel RX1. However, the round-trip delay times $\tau_1$ and $\tau_2$ are so small (in comparison with $f_{MOD}$) that the frequencies $f_1$ and $f_2$ are practically equal to the modulation frequency $f_{MOD}$. The phase values $\varphi_1$, and $\varphi_2$ associated with the frequencies $f_1$ and $f_2$ can be measured based on the digital radar signal $y[n]$. For this purpose, the modulated (frequency-shifted) LO signal $s_{LO}'(t)$ is firstly passed through the TX channel TX1 and the resulting output signal $y[n]$ of the RX channel RX1 is measured. Using spectral analysis, the phase $\varphi_1$ at the frequency $f_1$ can be determined from this digital radar signal $y[n]$. This process is repeated with the TX channel TX2 in order to determine a value for the phase $\varphi_2$. In the case of a general MIMO system, this process can be repeated for every available TX channel/RX channel pair.

The modulator 106 can be inactive during normal radar operation (e.g. for the measurement of position and speed of a radar target). By way of example, during normal radar operation, the modulator 106 can be bypassed, or the modulation frequency $f_{MOD}$ can be set to zero. The modulator 106 also need not necessarily be in the signal path from the local oscillator to the TX channel under consideration. Alternatively, the modulator can also be arranged in the signal path from the local oscillator to the RX path (cf. e.g. FIGS. 10 and 11) or in the baseband signal path (see e.g. FIG. 12). In all these variants, the modulator brings about a frequency shift by the modulation frequency $f_{MOD}$. In some example implementations, the modulator 106 can also be entirely omitted (see e.g. FIG. 13).

It can be shown that the phase shifts $\varphi_1$ and $\varphi_2$ (measurement values) assigned to the frequencies $f_1$ and $f_2$ are constituted as follows:

$$\varphi_1 = \Phi_1 - \Delta\Phi_1 + \Phi_{RX} \text{ and} \tag{9}$$

$$\varphi_2 = \Phi_2 - \Delta\Phi_2 + \Phi_{RX}. \tag{10}$$

In this case, $\Delta\Phi_1$ and $\Delta\Phi_2$ denote the unknown phase shifts in the TX channels TX1 and TX2, respectively, $\Phi_1$ and $\Phi_2$ denote the phases on account of the round-trip delay times $\tau_1$ and $\tau_2$ between the respective antennas, and $\Phi_{RX}$ denotes a constant phase offset in the RX channel. The phases $\Phi_1$ and $\Phi_2$ can be calculated as follows $$\Phi_1 = 2\pi(f_{START} - f_{MOD})\tau_1 - \pi k \tau_1^2 \text{ and} \tag{11}$$

$$\Phi_2 = 2\pi(f_{START} - f_{MOD})\tau_2 - \pi k \tau_2^2, \tag{12}$$

wherein $\tau_1 = d_1/c$ and $\tau_2 = d_2/c$ hold true for the round-trip delay times. The phases $\Phi_1$ and $\Phi_2$ are thus system parameters (design parameters) known a priori for a specific radar system in which the distances $d_1$ and $d_2$, respectively, between the antennas are known.

The difference $\Delta\Phi_2 - \Delta\Phi_1$ can be calculated based on equations (9) and (10) as follows (equations 9 and 10 are subtracted):

$$\Delta\Phi_2 - \Delta\Phi_1 = (\varphi_1 - \Phi_1) - (\varphi_2 - \Phi_2) = (\varphi_1 - \varphi_2) - (\Phi_1 - \Phi_2). \tag{13}$$

Based on this phase difference $\Delta\Phi_2 - \Delta\Phi_1$ calculated from measurement values (e.g. $\varphi_1$ and $\varphi_2$) and known system parameters (e.g. $\Phi_1$ and $\Phi_2$), the phase shift $\Delta\Phi_2$ can be altered for example using the phase shifter 105 arranged in the TX channel TX2 in such a way that the phase difference $\Delta\Phi_2 - \Delta\Phi_1$ corresponds to a desired setpoint value. The phase offset $\Phi_{RX}$ in the RX channel cancels out on account of the difference formation.

Figure 6:
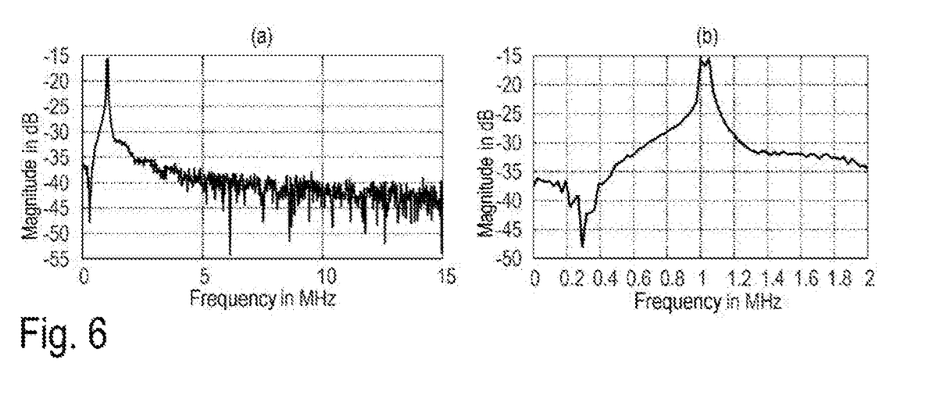
FIG. 6 shows by way of example a spectrum of a radar signal during the calibration of the phase shifts of the TX channels.

As mentioned, the measurement values $\varphi_1$ and $\varphi_2$ can be determined based on the output signals y(t) and y[n], respectively, of the RX channel. The left-hand diagram (a) in FIG. 6 shows by way of example a spectrum which was calculated based on the digital baseband radar signal y[n]. In this example, the modulation frequency $f_{MOD}$ is equal to 1 MHz, and the maxima on account of direct and indirect crosstalk thus occur at approximately 1 MHz. Given a ramp gradient k=100 MHz/s and round-trip delay times $\tau_1$=10 ps (corresponding to approximately $d_1$=3 mm), $\tau_2$=30 ps (corresponding to approximately $d_2$=9 mm), and $\tau_{B1} = \tau_{B2}$=300 ps this yields the following frequencies in the baseband on account of direct and indirect crosstalk: $f_1$=1.001 MHz, $f_2$=1.003 MHz and $f_{B1} = f_{B2}$=1.03 MHz. It can be discerned that the frequencies $f_1$ and $f_{B1}$ and also the frequencies $f_2$ and $f_{B2}$ are separated by only a few kilohertz, such that practically only one maximum arises in the left-hand diagram (a) from FIG. 6. This maximum is actually a superposition of two maxima that are close to one another, as can be seen in the right-hand diagram (b) in FIG. 6, which shows an enlarged view of the range of 0-2 MHz. For ascertaining the associated phases $\Phi_1$ and $\Phi_2$, the spectral lines at $f_1$ and $f_{B1}$ and also at $f_2$ and $f_{B2}$ may be separated, however, in order to be able to determine the measurement values $\varphi_1$ and $\varphi_2$. Various groups of algorithms are known for this purpose, for example one known as the relaxation algorithm (RELAX algorithm), which will be discussed in even greater detail later.

Figure 7:
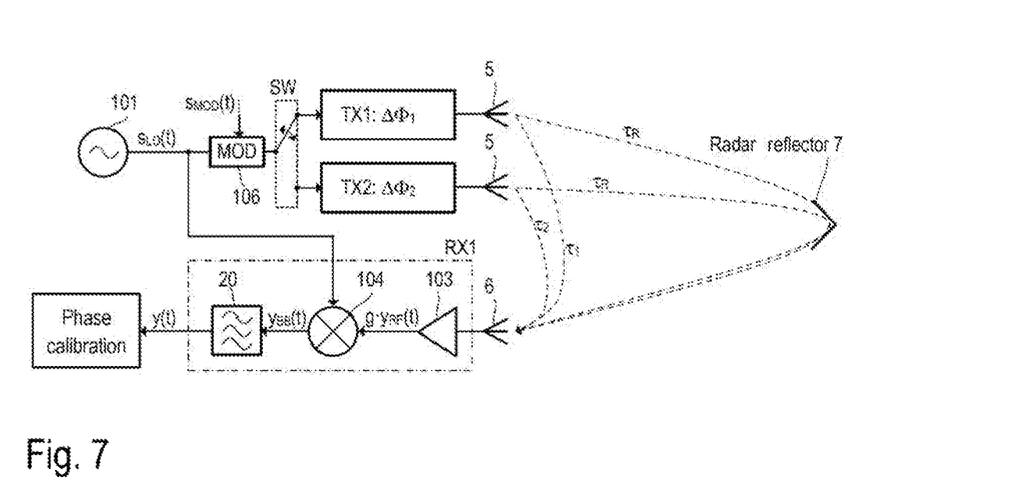
FIG. 7 is a simplified block diagram for illustrating a measurement set-up for measuring the phase on account of the signal round-trip delay time in the case of direct cross-talk.

In the example described above, the phases $\Phi_1$ and $\Phi_2$ on account of the round-trip delay times $\tau_1$ and $\tau_2$, respectively, are known system parameters that can be calculated based on the distances $d_1$ and $d_2$ of the antennas (cf. equations 11 and 12). A possibility that enables these phases $\Phi_1$ and $\Phi_2$ also to be ascertained using measurements is explained below. These measurements can be carried out e.g. in the context of an end-of-line (EOL) test. FIG. 7 illustrates the same radar system as FIG. 5. For the purpose of measuring the phases $\Phi_1$ and $\Phi_2$, however, a radar reflector 7 is arranged at a defined distance in front of the radar device. Said distance can be one to a plurality of meters, for example. The radar reflector 7 can be e.g. a corner reflector, also called retroreflector or triple mirror. The round-trip delay time of the radar signal to the radar reflector 7 and back again is designated by $\tau_R$. The radar reflector 7 causes, in the spectrum of the digital radar signal y[n] (digitized output signal of the RX channel RX1), a spectral line at the frequency $f_R = \tau_R k + f_{MOD}$ with an associated phase PR, which can be determined in the same way as the measurement values $\varphi_1$ and $\varphi_2$.

The measured phase $\varphi_R$ is constituted as follows (cf. equations 9 and 10)

$$\varphi_R = \Phi_R - \Delta\Phi_1 + \Phi_{RX}, \tag{14}$$

wherein the phase $\Phi_R$ on account of the round-trip delay time $\tau_R$ can be calculated as follows (cf. equations 11 and 12)

$$\Phi_R = 2\pi(f_{START} - f_{MOD})\tau_R - \pi k \tau_R^2. \tag{15}$$

The phase shift $\Delta\Phi_1$ in turn denotes the phase shift in the TX channel TX1. The round-trip delay time $\tau_R$ can be calculated simply from the distance of the radar reflector (doubled distance divided by the speed of light), and the phase $\Phi_R$ follows directly from the round-trip delay time $\tau_R$ in accordance with equation 15.

Direct crosstalk causes, in the spectrum of the digital radar signal y[n], a spectral line at the frequency $f_1 = \tau_1 k + f_{MOD}$ (see equation 5) with an associated phase $\varphi_1$. From equations (9) and (14), the following arises for the phase difference $\varphi_1 - \varphi_R$ $$\varphi_1 - \varphi_R = \Phi_1 - \Phi_R. \tag{16}$$

The sought phase shift $\Phi_1$ which can be assigned to the round-trip delay time $\tau_1$ follows directly from equations 15 and 16

$$\Phi_1 = (\varphi_1 - \varphi_R) + 2\pi(f_{START} - f_{MOD})\tau_R - \pi k \tau_R^2. \tag{17}$$

The same procedure can be used for the TX channel TX2 in order to determine the phase $\Phi_2$. These values $\Phi_1$ and $\Phi_2$ can be stored and used later in a real application (e.g. in the example explained above with reference to FIGS. 5 and 6) for calibrating the phase difference $\Delta\Phi_2 - \Delta\Phi_1$ (see equation 13). The phases $\varphi_1$ and $\varphi_2$ assigned to the frequencies $f_1$ and $f_2$ can be determined in a known manner (e.g. using spectral analysis).

The method just described (represented by equations 14 to 17) for ascertaining $\Phi_1$ and $\Phi_2$ uses an exact determination of the round-trip delay time $\tau_R$ of the radar signal to the radar reflector 7 and back again. Under certain circumstances, this round-trip delay time, which is proportional to the distance between the antennas and the reflector 7, is not always determinable with sufficient accuracy. This problem can be avoided with the following approach. The overriding goal is to ascertain the difference between the phase delays $\Delta\Phi_2 - \Delta\Phi_1$ in the TX channels TX1 and TX2. According to equation 13, for this only the difference $\Phi_1 - \Phi_2$ is used; the individual values of the phase shifts $\Phi_1$ and $\Phi_2$ are not relevant. This difference $\Phi_1 - \Phi_2$ can be determined as follows. A radar reflector 7 is positioned in front of the radar system such that it is at a horizontal angle (azimuth angle) and a vertical angle (elevation angle) of zero degrees with respect to the radar system. The round-trip delay times (RTDTs) of the radar signals of all the TX channels to the radar reflector 7 and back to the RX antenna are thus approximately identical (applying the far-field assumption). Given an identical round-trip delay time, the phase delays $\Phi_R$ caused by the round-trip delay time $\tau_R$ are also identical for all the TX antennas. In the case of a single measurement (e.g. via the TX channel TX1), a phase of $\varphi_{R,1} = \Phi_R - \Delta\Phi_1 + \Phi_{RX}$ can be observed for the spectral line at the frequency $f_R = k\tau_R + f_{MOD}$. In the case of a further measurement (e.g. via the TX channel TX2), a phase of $\varphi_{R,2} = \Phi_R - \Delta\Phi_2 + \Phi_{RX}$ can be observed at the same spectral line. Subtracting these two measurement values $\varphi_{R,1}$ and $\varphi_{R,2}$ yields the difference between the phase delays $$\Delta\Phi_2 - \Delta\Phi_1 = \varphi_{R,1} - \varphi_{R,2} \quad (18)$$

In a further step, the phases on account of direct crosstalk are measured as described further above (cf. equations 9 to 13). In this measurement, the phases $\varphi_1$ and $\varphi_2$ are obtained as measurement values. Rearranging equation 13 and substituting the difference $\Delta\Phi_2 - \Delta\Phi_1$ in accordance with equation 18 yields $$\Phi_1 - \Phi_2 = (\varphi_1 - \varphi_2) - (\Delta\Phi_2 - \Delta\Phi_1) = (\varphi_1 - \varphi_2) - (\varphi_{R,1} - \varphi_{R,2}). \quad (19)$$

After the conclusion of the calibration procedure carried out with the aid of the radar reflector 7, this difference $\Phi_1 - \Phi_2$ can be stored and used later in a real application (such as e.g. in the example explained above with reference to FIGS. 5 and 6) for measuring and calibrating the phase difference $\Delta\Phi_2 - \Delta\Phi_1$. As already explained above, this difference $\Phi_1 - \Phi_2$ represents the difference $\tau_1 - \tau_2$ in the signal round-trip delay times of direct crosstalk between the transmitting antennas connected to the TX channels TX1 and TX2, respectively, and the receiving antenna connected to the RX channel RX1 (cf. FIG. 7). The difference $\Phi_1 - \Phi_2$ in accordance with equation 19 is thus a fixed system parameter for a specific radar system.

Figure 8:
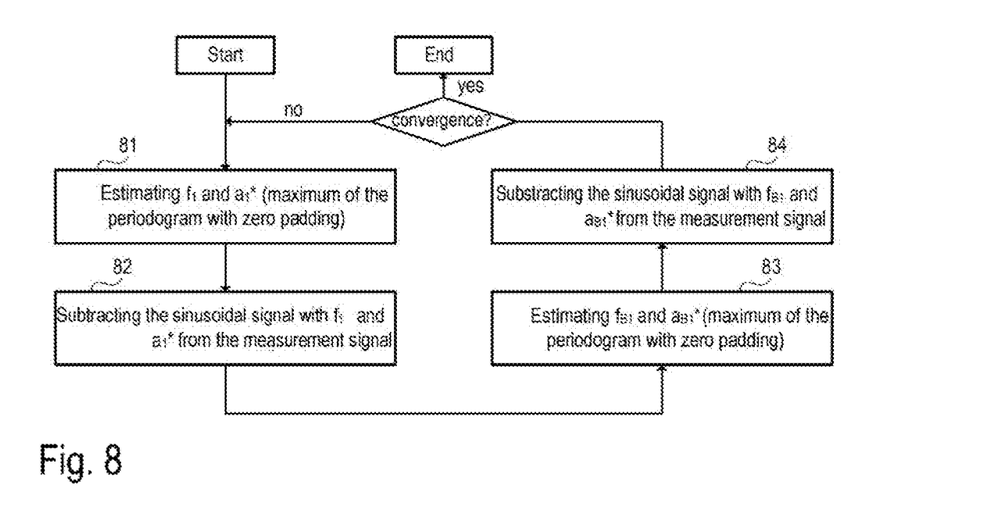
FIG. 8 illustrates, in a flow diagram, a RELAX algorithm for ascertaining the phase of a spectral line in the output signal of the RX channel.

RELAX algorithm—As mentioned above with reference to FIG. 5, the two frequencies $f_1$ and $f_{B,1}$, and also $f_2$ and $f_{B2}$, etc., may be very close to one another, with the result that during a spectral analysis using a discrete Fourier transformation with signal segments of customary length (e.g. 256 samples or 512 samples), the frequency resolution is too low to cleanly separate the spectral lines at the frequencies $f_1$ and $f_{B1}$. However, algorithms are known which make it possible to estimate the spectral lines (magnitude and phase, or real part and imaginary part of a complex amplitude) at (discrete) frequencies that are very close to one another. FIG. 8 illustrates one approach implemented by an algorithm referred to as the RELAX algorithm (cf. e.g. Jian Li, Petre Stoica, "Efficient Mixed-Spectrum Estimation with Applications to Target Feature Extraction", in: IEEE Trans. on Signal Processing, vol. 44, No. 2, 1996, pages 281-295).

The RELAX algorithm makes use of an iterative method. In accordance with FIG. 8, a periodogram is calculated for a segment of the digital radar signal y[n] (digitized output signal of the baseband signal processing chain 20, see e.g. FIG. 4). A fast Fourier transform (FFT) algorithm and zero padding are used for this calculation. The zero padding increases the length of the segment and thus the visual frequency resolution. The frequency $f_1$ and the associated complex amplitude $a_1^*$ can be estimated from the periodogram (FIG. 8, step 81; the asterisk here denotes a complex number). Then (in the time domain), the sinusoidal signal defined by the parameters $f_1$ and $a_1^*$ can be subtracted from the measurement data (e.g. the considered segment of the digital radar signals y[n]) (FIG. 8, step 82). The frequency $f_{B1}$ and the associated complex amplitude $a_{B1}^*$ can then be estimated from the resulting reference signal (FIG. 8, step 83). Then (in the frequency domain) the sinusoidal signal defined by the parameters $f_{B1}$ and $a_{B1}^*$ is subsequently subtracted from the measurement data (FIG. 8, step 84). Afterward, the method can be repeated until the estimated values no longer change significantly, e.g. convergence has occurred. That is to say that the frequency $f_1$ and the associated complex amplitude $a_1^*$ can then again (second iteration) be estimated from the resulting reference signal (FIG. 8, step 81) etc.

The method shown in FIG. 8 relates to the measurement of the phase shift $\varphi_1$ (cf. equation (9)) for the calibration of the phase shift in the TX channel TX1. The method can equally be repeated for the calibration of the phase shift in the TX channel TX2. The phase shift $\varphi_2$ (cf. equation (10)) is measured in this case. The phase shifts sought are in each case the argument of the complex amplitudes $a_1^*$ and $a_2^*$, e.g. $\varphi_1 = \arg\{(a_1^*\} $ and $\varphi_2 = \arg\{a_2^*\}$.

FIG. 9 illustrates, via a block diagram, a simplified example of a distributed MIMO radar system comprising a plurality of MMICs 100, 200. In the present example, two TX channels and two RX channels are arranged in the master MMIC 100 and a plurality of further TX channels are arranged in the slave MMIC 200. The outputs of the TX channels are connected to the transmitting antennas 5 and the inputs of the RX channels are connected to the receiving antennas 6. Operation of the master MMIC 100 and operation of the slave MMIC 200 are synchronized. Example implementations of this synchronization are illustrated in FIGS. 10 and 11. Master MMIC 100 and slave MMIC 200 are connected to the controller 50 and the computing unit 40, in a manner similar to that as illustrated in the example from FIG. 3. Radar systems constructed from a plurality of MMICs are known per se and will therefore not be explained in any greater detail.

FIG. 10 illustrates an example of a distributed radar system comprising two TX channels TX1 and TX2 and one RX channel RX1, wherein the TX channel TX1 and the RX channel RX1 are arranged in a first MMIC 100 (master MMIC) and the TX channel TX2 is arranged in a second MMIC 200 (slave MMIC). It goes without saying that FIG. 10 merely shows a simplified example, and MIMO radar systems used in practice can comprise more than two MMICs. The TX channels TX1, TX2 and the RX channel RX1 can be constructed in a manner substantially identical to that in the example from FIG. 4. In the present example, a respective local oscillator is arranged both in the master MMIC 100 and in the slave MMIC 200. The local oscillator in the MMIC 100 is designated by 101 and the local oscillator in the MMIC 200 is designated by 201. The LO signals are designated by $s_{LO}'(t)$ and $s_{LO}''(t)$, respectively. For radar operation, the LO signals $s_{LO}'(t)$ and $s_{LO}''(t)$ have to be at least approximately coherent, which is achieved in the present case by a synchronization of the local oscillators 101 and 201 using a clock signal $s_{CLK}(t)$. The local oscillators 101 and 201 can be implemented e.g. using a voltage-controlled oscillator interconnected in a phase-locked loop, wherein the phase-locked loops receive the same clock signal $s_{CLK}(t)$. The clock signal $s_{CLK}(t)$ can be generated by a clock generator (not illustrated) arranged in the master MMIC 100. Alternatively, the clock signal $s_{CLK}(t)$ can also be generated by a separated external clock generator. In another example implementation, the clock generator is arranged in the system controller 50.

Unlike in the example from FIG. 5, however, the modulator 106 in the master MMIC 100 is arranged in the RF signal path from the local oscillator 101 to the mixer 104. Consequently, the frequency-shifted LO signal $s_{LO}'(t)$ is not received by the TX channels TX1 and TX2 but rather by the mixer 104 in the receiving channel RX1 at its reference input. The effect in the baseband is the same, however, as in the example in FIG. 5. As a result of the modulation of the LO signals $s_{LO}(t)$ with the modulation frequency $f_{MOD}$, the spectrum of the baseband signal is also shifted by a frequency offset that is equal to the modulation frequency $f_{MOD}$. The measurement of the phase shifts $\varphi_1$ and $\varphi_2$ that arise on account of the round-trip delay times $\tau_1$ and $\tau_2$ can be effected in the same way as in the previous example from FIG. 5. As already mentioned, during normal radar operation, the modulator 106 may be inactive, for example as a result of the modulator 106 being bypassed or as a result of the modulation frequency $f_{MOD}$ being set to zero. During normal radar operation, a frequency shift by the magnitude of $f_{MOD}$ would have the effect of crosstalk or short-range leakage causing artifacts in the range Doppler map taken as a basis for the detection of radar targets, and adversely influencing the signal-to-noise ratio.

The example from FIG. 11 is very similar to the previous example from FIG. 10. Unlike in the example from FIG. 10, the slave MMIC 200 does not require a dedicated local oscillator synchronized with the local oscillator of the master MMIC 100; rather, the LO signal $s_{LO}(t)$ of the local oscillator 101 is transmitted from the master MMIC 100 to the slave MMIC 200 (e.g. using striplines). It should be noted at this juncture that the RF switch SW shown in FIG. 5 has been omitted in the examples from FIGS. 10 and 11 for the sake of simplicity. The RF switch is also not absolutely necessary. In the example implementations described here, instead of using the switch SW, the TX channels TX1, TX2 can also be activated selectively. An activation/deactivation of a TX channel can be achieved e.g. by the RF amplifier contained in the respective channel therein being activated/deactivated. For the rest, the example implementation from FIG. 11 is identical to the previous example from FIG. 10. Finally, it should also be mentioned that the example implementation shown in FIG. 11 is not restricted to distributed radar systems; the concept illustrated can also be used in the case of a single-chip radar system comprising only one MMIC.

Figure 12:
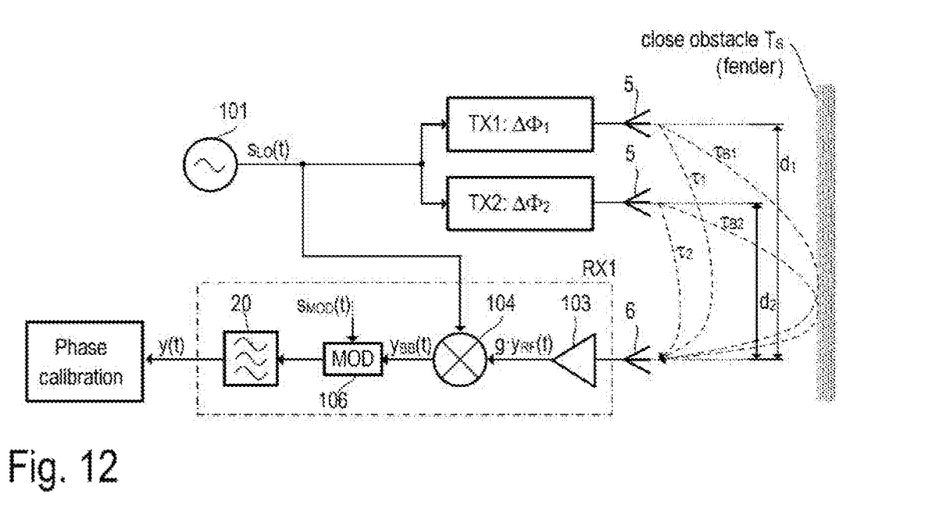
FIG. 12 shows a further example implementation in which the baseband signal is frequency-shifted using modulation.

FIG. 12 illustrates a further example of a radar system, which is similar to the example from FIG. 11. The only difference resides in the arrangement of the modulator 106. Unlike in the previous example implementation, the modulator 106 is not connected between local oscillator 101 and mixer 104, but rather is connected to the output of the mixer 104, such that the mixer output signal $y_{BB}(t)$ is modulated (and thus frequency-shifted) before high-pass/bandpass filtering is carried out in the baseband signal processing chain 20. However, the effect in the output signal y(t) of the baseband signal processing chain 20 is the same as in the previous examples. As a result of the modulation of the mixer output signal $y_{BB}(t)$ with the modulation frequency $f_{MOD}$, the spectrum of the digitized baseband signal y[n] is also shifted by a frequency offset that is equal to the modulation frequency $f_{MOD}$. The measurement of the phase shifts $\varphi_1$ and $\varphi_2$ that arise on account of the round-trip delay times $\tau_1$ and $\tau_2$ can be effected in the same way as in the previous examples.

Figure 13:
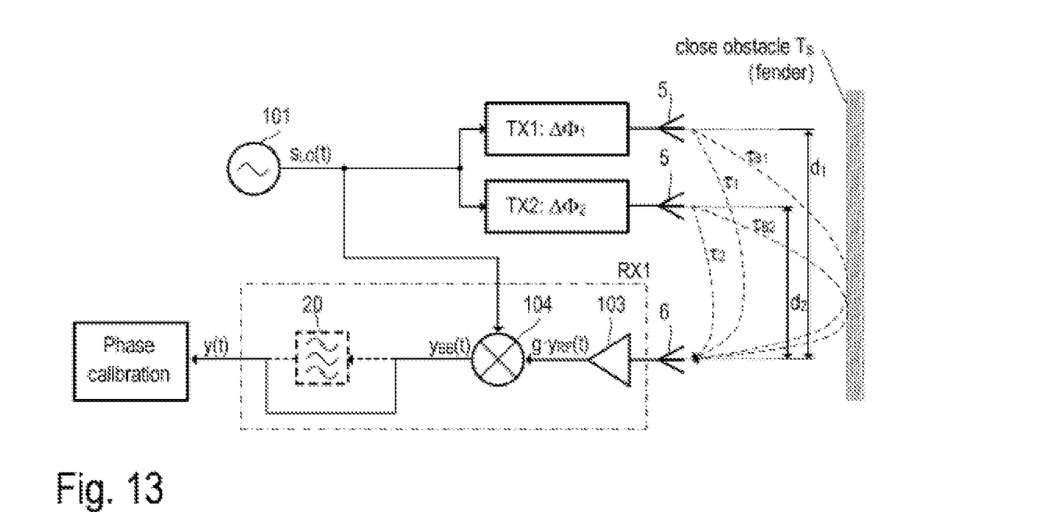
FIG. 13 illustrates an alternative to the example from FIG. 12.

FIG. 13 illustrates an alternative to the example from FIG. 12. The modulator 106 is not required in this example. The frequency shift—brought about by the modulator 106—by the magnitude of the modulation frequency $f_{MOD}$ can be dispensed with if—as illustrated in FIG. 13—the baseband signal processing chain 20 and thus the high-pass or bandpass filter contained therein is bypassed or deactivated. However, it is not necessary to bypass the entire baseband signal processing chain 20 connected downstream of the mixer 104; in particular, amplifiers in the baseband can remain active. However, those components which have a lower cut-off frequency and a high-pass filter characteristic associated therewith may be bypassed or deactivated. If the analog signal processing applied in the baseband does not bring about filtering of low frequencies, the signal components that arise on account of direct and indirect crosstalk can be digitized by the downstream analog-to-digital convertor (not illustrated in FIG. 13; see FIGS. 3 and 4). The method explained further above with reference to equations 9-13, and also the determination of the system parameter $\Phi_1-\Phi_2$ in accordance with equation 19, are also possible in this example implementation, wherein $f_{MOD}$ is set to zero in the equations mentioned $f_{MOD}=\Phi$. Apart from the absent modulator and the bypassed baseband signal processing chain 20, the example from FIG. 13 is identical to the examples from FIG. 5 or 12.

Figure 14:
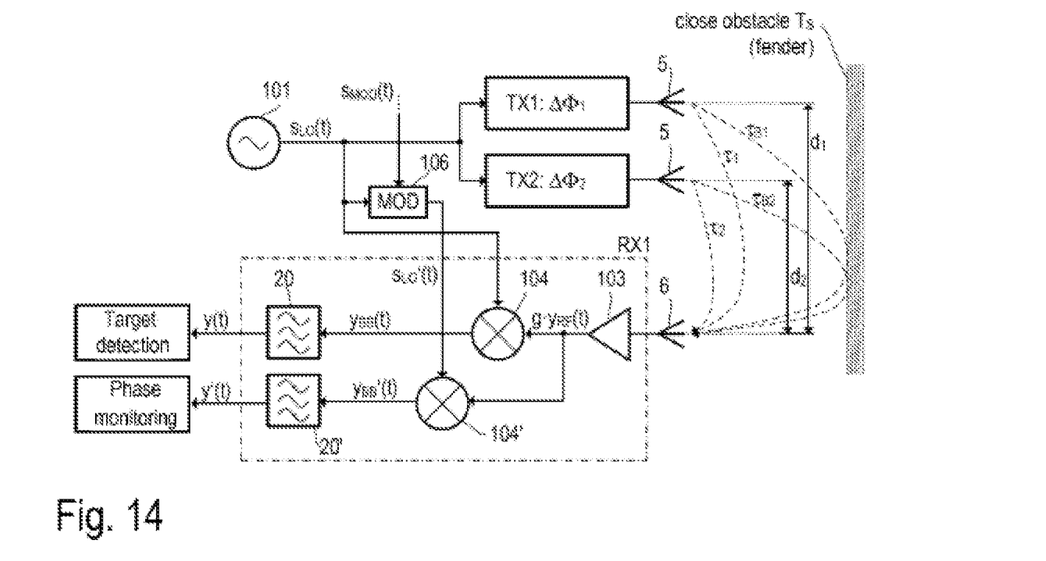
FIG. 14 is a block diagram for illustrating an example implementation that allows monitoring of the output phase during a radar measurement.

The example from FIG. 14 illustrates a radar system in which both the calibration of the phases of the TX channels (output phases $\Delta\Phi_1$ and $\Delta\Phi_2$ that is described in detail above and the ongoing monitoring of the output phases are possible. Such monitoring makes it possible to detect undesired changes in the output phases and, if appropriate, to trigger a recalibration. For this purpose, the RX channel has two mixers 104 and 104', to both of which the preamplified antenna signal $g \cdot y_{RF}(t)$ is fed at their RF inputs. The LO signal $s_{LO}(t)$ is fed to the mixer 104 at the reference input thereof, whereas the modulated/frequency-shifted LO signal $s_{LO}'(t)$ is fed to the mixer 104' at the reference input thereof. The output signals of the mixers 104 and 104' are designated by $y_{BB}(t)$ and $y_{BB}'(t)$, respectively. A respective baseband signal processing chain 20 and 20' is connected downstream of the mixers 104 and 104', the output signals (baseband signals) of the baseband signal processing chain being designated by y(t) and y'(t) respectively. The corresponding digital signals are designated by y[n] and y'[n] respectively (analog-to-digital converters are not illustrated in FIG. 14).

In the present example, the digital radar signal y[n] can be used to detect radar targets. Various signal processing techniques are known for this purpose, for example range Doppler analysis. The digital radar signal y'[n] can be used for the phase monitoring, wherein the calculation of the phase shifts $\Delta\Phi_1$ and $\Delta\Phi_2$ in the TX channels TX1 and TX2, respectively, can be separately determined and monitored as explained above with reference to FIG. 5. In particular, the phase differences between the TX channels can also be determined (e.g. $\Delta\Phi_2-\Delta\Phi_1$, cf. equation 13).

Figure 15:
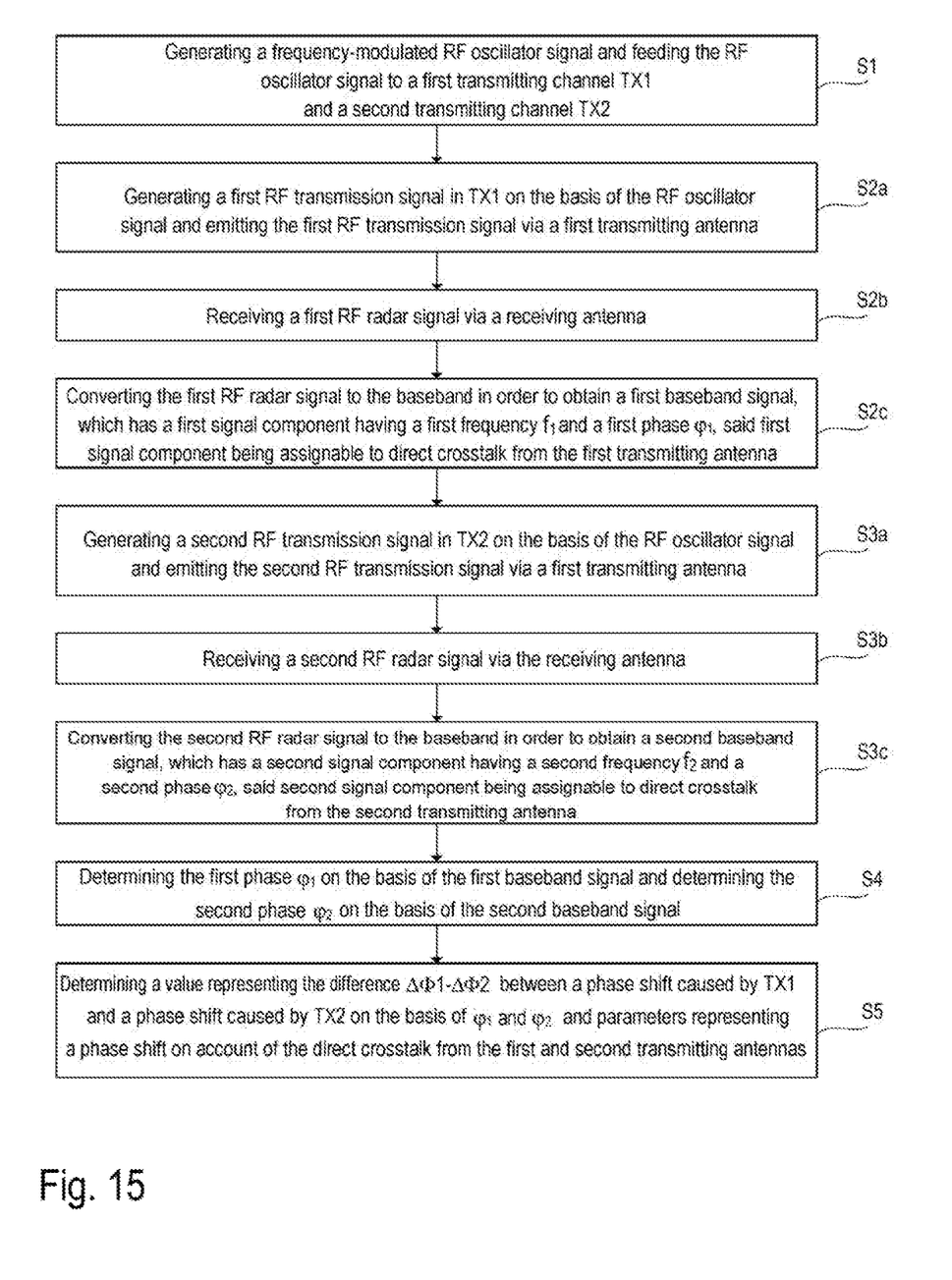
FIG. 15 is a flow diagram for illustrating one example implementation of the methods described here.

FIG. 15 is a flow diagram for illustrating one example implementation of a method which can be carried out by the radar systems described here. Accordingly, the method comprises generating (see FIG. 15, step S1) a frequency-modulated RF oscillator signal, which is fed to a first transmitting channel and a second transmitting channel (e.g. TX1, TX2, cf. FIGS. 5 and 10-14). Said RF oscillator signal can be the LO signal $s_{LO}(t)$ (cf. e.g. FIGS. 10-14) or the frequency-shifted LO signal $s_{LO}'(t)$ (see e.g. FIG. 5).

The method further comprises generating a first RF transmission signal in the first transmitting channel (see e.g. FIG. 5, TX1) based on the RF oscillator signal and emitting the first RF transmission signal via a first transmitting antenna (see FIG. 15, step S2a), receiving a first RF radar signal via a receiving antenna (see FIG. 15, step S2b), and converting the first RF radar signal into a baseband (see FIG. 15, step S2c). As a result, a first baseband signal is obtained, which has a first signal component having a first frequency $f_1$ and a first phase $\varphi_1$, the first signal component being assignable to direct crosstalk from the first transmitting antenna. The same is done for the second transmitting channel, e.g. generating a second RF transmission signal in the second transmitting channel (see e.g. FIG. 5, TX2) based on the RF oscillator signal and emitting the second RF transmission signal via a second transmitting antenna (see FIG. 15, step S3a), receiving a second RF radar signal via the receiving antenna (see FIG. 15, step S3b), and converting the second RF radar signal to the baseband (see FIG. 15, step S3c). As a result, a second baseband signal is obtained, which has a second signal component having a second frequency $f_2$ and a second phase $\varphi_2$, the second signal component being assignable to direct crosstalk from the second transmitting antenna.

The method further comprises determining the first phase $\varphi_1$ based on the first baseband signal and determining the second phase $\varphi_2$ based on the second baseband signal (see FIG. 15, step S4). These measurement values $\varphi_1$ and $\varphi_2$ can be calculated by the above-described RELAX algorithm (cf. FIG. 8), for example, from the complex amplitudes $a_1^*$ and $a_2^*$ which were determined for the spectral lines at the frequencies $f_1$ and $f_2$. Finally, a value representing the difference $\Delta\Phi_2-\Delta\Phi_1$ between a phase shift $\Delta\Phi_2$ caused by the second transmitting channel and a phase shift $\Delta\Phi_1$ caused by the first transmitting channel is calculated (see FIG. 15, step S5). Input values for this calculation (see e.g. equation 13) are measured phases $\varphi_1$ and $\varphi_2$ and also one or more system parameters $\Phi_1$ and $\Phi_2$ representing a phase shift on account of direct crosstalk from the first transmitting antenna and direct crosstalk from the second transmitting antenna (see equations 11 and 12). The first and second frequencies $f_1$ and $f_2$ are dependent on the gradient k (MHz/s) of the frequency ramp, the signal round-trip delay times $\tau_1$ and $\tau_2$ of direct crosstalk, and also on the modulation frequency $f_{MOD}$ used (cf. equations 5 and 7). Depending on the distances between the antennas, the first and second frequency $f_1$ and $f_2$ can also be identical. The first and second baseband signals can also contain signal components caused by indirect crosstalk (reflection at a short-range target).

Once the difference $\Delta\Phi_2-\Delta\Phi_1$ has been determined, the phase shifts $\Delta\Phi_1$, $\Delta\Phi_2$ of the transmitting channels TX1, TX2 can be set (calibrated) such that the difference $\Delta\Phi_2-\Delta\Phi_1$ assumes a desired value. This calibrating can be carried out e.g. with the aid of the phase shifters 105, contained in the transmitting channels (cf. FIG. 4). The measurement of the phase difference $\Delta\Phi_2-\Delta\Phi_1$ and the subsequent calibration can be repeated for various combinations of transmitting and receiving channels. Furthermore, a recalibration can be instigated regularly or upon the occurrence of specific events (e.g. a specific temperature change). The sequence control in this regard can be undertaken e.g. by the system controller 50 (cf. FIG. 3).

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
generating a frequency-modulated radio frequency (RF) oscillator signal and providing the RF oscillator signal to a first transmitting channel and a second transmitting channel;
generating a first RF transmission signal in the first transmitting channel based on the RF oscillator signal and emitting the first RF transmission signal via a first transmitting antenna;
receiving a first RF radar signal via a receiving antenna and converting the first RF radar signal into a baseband, wherein a first baseband signal is obtained, which has a first signal component having a first frequency and a first phase, the first signal component being assignable to direct crosstalk from the first transmitting antenna;
generating a second RF transmission signal in the second transmitting channel based on the RF oscillator signal and emitting the second RF transmission signal via a second transmitting antenna;
receiving a second RF radar signal via the receiving antenna and converting the second RF radar signal into the baseband, wherein a second baseband signal is obtained, which has a second signal component having a second frequency and a second phase, the second signal component being assignable to direct crosstalk from the second transmitting antenna;
determining the first phase based on the first baseband signal and determining the second phase based on the second baseband signal; and
determining a value representing a difference between a phase shift caused by the first transmitting channel and a phase shift caused by the second transmitting channel, based on the first phase and the second phase and further based on parameters, representing a phase shift on account of the direct crosstalk from the first transmitting antenna and the direct crosstalk from the second transmitting antenna.

2. The method as claimed in claim 1,
wherein converting the first RF radar signal and the second RF radar signal to the baseband is carried out in each case by mixing with an RF reference signal, wherein the RF reference signal and the RF oscillator signal are frequency-shifted with respect to one another by a frequency offset.

3. The method as claimed in claim 2,
wherein the RF reference signal is generated by a local oscillator and the RF oscillator signal is generated from the RF reference signal using modulation with a modulation signal of constant frequency.

4. The method as claimed in claim 2,
wherein the RF oscillator signal is generated by a local oscillator and the RF reference signal is generated from the RF oscillator signal by modulation with a modulation signal of constant frequency.

5. The method as claimed in claim 1,
wherein the first baseband signal and/or the second baseband signal are/is frequency-shifted by a frequency offset using modulation.

6. The method as claimed in claim 1, further comprising:
adapting a phase shift in the first transmitting channel and/or the second transmitting channel based on the value representing the difference between the phase shift caused by the first transmitting channel and the phase shift caused by the second transmitting channel.

7. The method as claimed in claim 6,
wherein the first baseband signal has a further signal component having a third frequency and a third phase, the further signal component being assignable to indirect crosstalk from the first transmitting antenna; and
wherein determining the first phase comprises:
estimating the further signal component based on the first baseband signal;
subtracting the estimated further signal component from the first baseband signal; and
estimating the first signal component assignable to the direct crosstalk based on the first baseband signal remaining after subtracting the estimated further signal component.

8. A radar device comprising:
a first transmitting channel having an output for connection of a first transmitting antenna;
a second transmitting channel having an output for connection of a second transmitting antenna;
a local oscillator configured to generate a frequency-modulated radio frequency (RF) oscillator signal, wherein the local oscillator is connectable to the first transmitting channel and the second transmitting channel in order to provide the RF oscillator signal to the first transmitting channel and the second transmitting channel;
a receiving channel connectable to a receiving antenna, wherein the receiving channel is configured to:
receive a first RF radar signal belonging to the first transmitting channel and mix the first RF radar signal with a baseband, wherein a first baseband signal is obtained, which has a first signal component having a first frequency and a first phase, the first signal component being assignable to direct crosstalk from the first transmitting antenna; and
receive a second RF radar signal belonging to the second transmitting channel and mix the second RF radar signal with a baseband, wherein a second baseband signal is obtained, which has a second signal component having a second frequency and a second phase, the second signal component being assignable to direct crosstalk from the second transmitting antenna; and
a computing unit coupled to the receiving channel and configured to:
determine the first phase based on the first baseband signal and determine the second phase based on the second baseband signal; and
determine a value representing a difference between a phase shift caused by the first transmitting channel and a phase shift caused by the second transmitting channel, based on the first phase and the second phase and further based on parameters, representing a phase shift on account of the direct crosstalk from the first transmitting antenna and the direct crosstalk from the second transmitting antenna.

9. The radar device of claim 8, further comprising one or more processors configured to:
adapt a phase shift in the first transmitting channel and/or the second transmitting channel based on the value representing the difference between the phase shift caused by the first transmitting channel and the phase shift caused by the second transmitting channel.

10. A device, comprising:
one or more memories; and
one or more processors, coupled to the one or more memories, configured to:
generate a frequency-modulated radio frequency (RF) oscillator signal and providing the RF oscillator signal to a first transmitting channel and a second transmitting channel;
generate a first RF transmission signal in the first transmitting channel based on the RF oscillator signal and emitting the first RF transmission signal via a first transmitting antenna;
receive a first RF radar signal via a receiving antenna and converting the first RF radar signal into a baseband, wherein a first baseband signal is obtained, which has a first signal component having a first frequency and a first phase, the first signal component being assignable to direct crosstalk from the first transmitting antenna;
generate a second RF transmission signal in the second transmitting channel based on the RF oscillator signal and emitting the second RF transmission signal via a second transmitting antenna;
receive a second RF radar signal via the receiving antenna and converting the second RF radar signal into the baseband, wherein a second baseband signal is obtained, which has a second signal component having a second frequency and a second phase, the second signal component being assignable to direct crosstalk from the second transmitting antenna;
determine the first phase based on the first baseband signal and determining the second phase based on the second baseband signal; and
determine a value representing a difference between a phase shift caused by the first transmitting channel and a phase shift caused by the second transmitting channel, based on the first phase and the second phase and further based on parameters, representing a phase shift on account of the direct crosstalk from the first transmitting antenna and the direct crosstalk from the second transmitting antenna.

11. The device of claim 10,
wherein converting the first RF radar signal and the second RF radar signal to the baseband is carried out in each case by mixing with an RF reference signal, wherein the RF reference signal and the RF oscillator signal are frequency-shifted with respect to one another by a frequency offset.

12. The device of claim 11,
wherein the RF reference signal is generated by a local oscillator and the RF oscillator signal is generated from the RF reference signal using modulation with a modulation signal of constant frequency.

13. The device of claim 11,
wherein the RF oscillator signal is generated by a local oscillator and the RF reference signal is generated from the RF oscillator signal by modulation with a modulation signal of constant frequency.

14. The device of claim 10, wherein the one or more processors are further configured to:
adapt a phase shift in the first transmitting channel and/or the second transmitting channel based on the value representing the difference between the phase shift caused by the first transmitting channel and the phase shift caused by the second transmitting channel.

15. The device of claim 14,
wherein the first baseband signal has a further signal component having a third frequency and a third phase, the further signal component being assignable to indirect crosstalk from the first transmitting antenna, and
wherein the one or more processors, to determine the first phase, are configured to:
estimate the further signal component based on the first baseband signal;
subtract the estimated further signal component from the first baseband signal; and
estimate the first signal component assignable to the direct crosstalk based on the first baseband signal remaining after subtracting the estimated further signal component.

16. A non-transitory computer-readable medium storing a set of instructions, the set of instructions comprising:
one or more instructions that, when executed by one or more processors of a device, cause the device to:
generate a frequency-modulated radio frequency (RF) oscillator signal and providing the RF oscillator signal to a first transmitting channel and a second transmitting channel;
generate a first RF transmission signal in the first transmitting channel based on the RF oscillator signal and emitting the first RF transmission signal via a first transmitting antenna;
receive a first RF radar signal via a receiving antenna and converting the first RF radar signal into a baseband, wherein a first baseband signal is obtained, which has a first signal component having a first frequency and a first phase, the first signal component being assignable to direct crosstalk from the first transmitting antenna;
generate a second RF transmission signal in the second transmitting channel based on the RF oscillator signal and emitting the second RF transmission signal via a second transmitting antenna;
receive a second RF radar signal via the receiving antenna and converting the second RF radar signal into the baseband, wherein a second baseband signal is obtained, which has a second signal component having a second frequency and a second phase, the second signal component being assignable to direct crosstalk from the second transmitting antenna;
determine the first phase based on the first baseband signal and determining the second phase based on the second baseband signal; and
determine a value representing a difference between a phase shift caused by the first transmitting channel and a phase shift caused by the second transmitting channel, based on the first phase and the second phase and further based on parameters, representing a phase shift on account of the direct crosstalk from the first transmitting antenna and the direct crosstalk from the second transmitting antenna.

17. The non-transitory computer-readable medium of claim 16,
wherein converting the first RF radar signal and the second RF radar signal to the baseband is carried out in each case by mixing with an RF reference signal, wherein the RF reference signal and the RF oscillator signal are frequency-shifted with respect to one another by a frequency offset.

18. The non-transitory computer-readable medium of claim 17,
wherein the RF reference signal is generated by a local oscillator and the RF oscillator signal is generated from the RF reference signal using modulation with a modulation signal of constant frequency.

19. The non-transitory computer-readable medium of claim 17,
wherein the RF oscillator signal is generated by a local oscillator and the RF reference signal is generated from the RF oscillator signal by modulation with a modulation signal of constant frequency.

20. The radar device of claim 9,
wherein the first baseband signal has a further signal component having a third frequency and a third phase, the further signal component being assignable to indirect crosstalk from the first transmitting antenna, and
wherein the computing unit, to determine the first phase, are configured to:
estimate the further signal component based on the first baseband signal;
subtract the estimated further signal component from the first baseband signal; and
estimate the first signal component assignable to the direct crosstalk based on the first baseband signal remaining after subtracting the estimated further signal component.

* * * * *